(No Model.)
G. B. ST. JOHN.
PLOW.
No. 294,699. Patented Mar. 4, 1884.
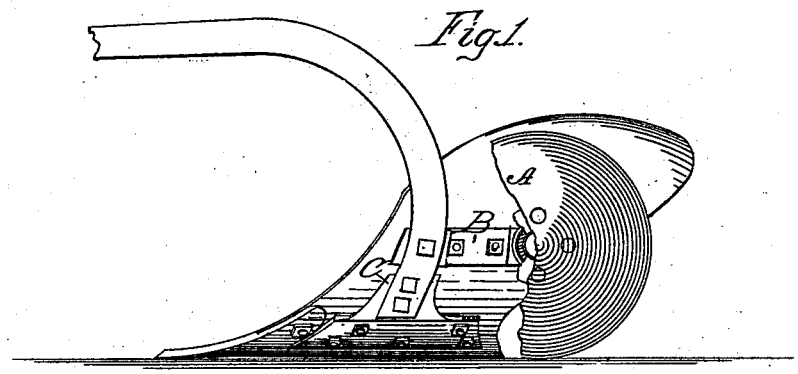
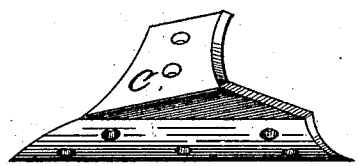
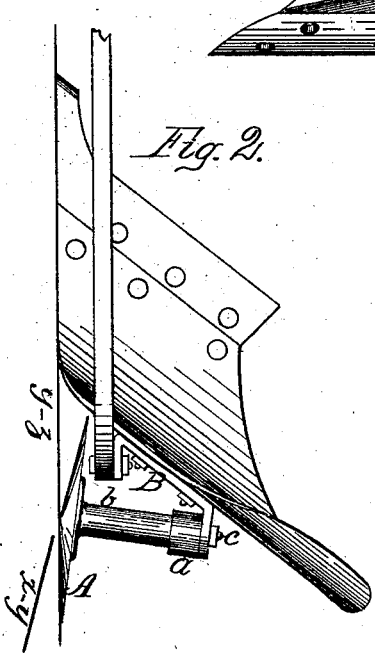
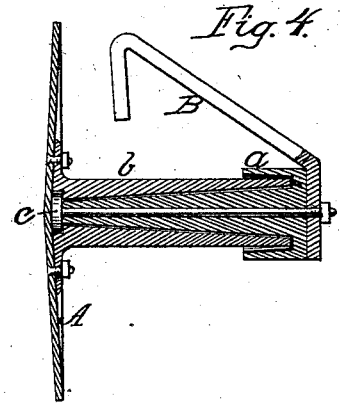
Witnesses.
Inventor,
Garland B. St. John,
By his Attorney,
J. M. St. John.

UNITED STATES PATENT OFFICE.

GARLAND B. ST. JOHN, OF JACKSON, MICHIGAN.

PLOW.

SPECIFICATION forming part of Letters Patent No. 294,699, dated March 4, 1884.

Application filed December 1, 1883. (No model.)

*To all whom it may concern:*

Be it known that I, GARLAND B. ST. JOHN, a citizen of the United States, residing at Jackson, in the county of Jackson and State of Michigan, have invented certain new and useful Improvements in Plows, of which the following is a specification.

The object of this invention is to produce a revolving-landside plow that shall possess in a single device some of the most valuable features of several devices, resulting in points of great superiority in the construction and operation of the plow.

The nature of the invention consists in combining the convex form of disk and mode of operating the same with the features of the thin penetrating blade when the same is used as a landside for a plow.

It consists also in a more simple, effective, and durable mounting for the disk and an improved bracket for connecting it with the plow.

It further consists in an improved frog for attaching the beam to the mold-board and share.

In the accompanying sheet of drawings, Figure 1 represents a side elevation of the plow with a portion of the disk cut away to show the bracket; Fig. 2, a plan view of the same; Fig. 3, the frog in perspective, and Fig. 4 a sectional view of the disk and its mountings in detail.

Similar reference-letters indicate corresponding parts.

It will be observed that the disk A is both thin and convex—elements not new taken separately in their application to this purpose, as both are set forth in patents numbered 254,723 and 278,623, heretofore issued to me for improvements in plows. The advantages of the thin blade consist in its ability to penetrate the soil and guide the plow immediately back to place when thrown out by a formidable obstruction. By so penetrating the soil the disk holds the line of its cut and returns at once to the furrow, while a wheel with a wide tread, although it be V-shaped, will not penetrate to any considerable depth, and will slide in consequence of the increased lateral resistance of the furrow, whose width increases in proportion as the plow "runs to land." In performing this operation one advantage of the convex disk is seen, as the line of its cut $x$ $y$ runs across the line of its draft $y$ $z$ at an acute angle and in the direction of the furrow or the plowed ground, whereby the plow is quickly restored to its proper position under the conditions above recited. Another advantage arising from this form of disk is that in operation only a portion of the rear half of the disk bears against the side of the furrow, as will be seen in Fig. 2, the line $y$ $z$ representing the land side of the furrow as well as the line of draft. By reason of this the draft is made exceedingly light. As heretofore applied, the convex wheel or disk with a broad tread has only been used. Beside the tendency of the latter to slip, as stated above, it is also liable to gather soil on its periphery, especially in clay, and thus injure the work of the plow. By using a thin disk this difficulty is entirely avoided. The combination of the thin edge and convex form in a disk for a landside secures all the advantages of either and both of them in increased proportion, and the result is a plow-landside that will clean at all times and perform the work for which it is designed with unerring certainty.

In defining a thin edge I do not necessarily mean a sharp edge, as the end to be accomplished is depth of penetration into the soil, which can only be done by a blade of thin material. From one-eighth to one-half inch in thickness, according to the material used, the thinner being the better, is found to approximately represent the extremes of thickness that can be successfully used.

Figs. 1, 2, and 4 show the means I here employ for attaching the disk to the plow. B is a bracket, which is made to do the double duty of securing the upper part of the mold-board to the beam or standard, as the case may be, whether wood or iron beam is used, and also to serve as a support for the disk. The form and manner of attachment will be well understood by those skilled in the art without further description.

In Fig. 4 an enlarged section of the disk and its mountings is shown. The axle and washer or sand-band $a$ $a$ are one in this case, although it is obvious that like results would be obtained if they were separate. The hub $b$ is chambered at the end connecting with the disk, to admit of its free revolution around the head of bolt c, which secures the axle to the bracket B. By this arrangement of parts the hub and axle are protected from dirt, the washer overcapping the hub, affording protection at that end, while the other is completely beyond the reach of dust or grit. It will be noticed that the head of bolt c is larger in diameter than the axle, and its position in the chamber of the hub b serves to hold the latter in position.

The frog C, for connecting the beam, mold-board, and share, is shown in Figs. 1 and 3. One wing is turned downward and curved to conform to the mold-board and share, to which it is bolted. The other is turned upward to receive the beam. The angles are represented in Fig. 3, and the device so constructed makes a simple, cheap, and effective one for this purpose.

Having thus briefly described my invention, what I claim as new, and desire to secure by Letters Patent, is—

1. In a disk-landside plow, the combination of the plow beam or standard with the bracket B, axle a, hub b, and disk A, secured by bolt c, substantially as described.

2. The combination, with a plow, of a frog, C, made separate from the standard or beam and bolted to it, and also to the mold-board and share, said frog consisting of a vertical portion, a horizontal portion, and a curved or concave portion, substantially as and for the purposes described.

3. The combination, with the mold-board and beam or standard, of the angular bracket B, secured at one end to the standard, at the other end to the axle-arm of a hub, bearing a convex turning-landside disk, A, and also secured to the mold-board, substantially as described.

4. The combination, with the mold-board and beam or standard, of the angular bracket secured at one end to the standard and at or near the other end to the mold-board, of a hub bearing a convex turning-landside disk, said disk being set with its front part leading inward, and sustained by the said bracket, substantially as described.

5. The combination, with the plow-standard and mold-board, of the rotating-landside disk A, the bracket B, the flanged and recessed hub b, the axle having a sand-band, and the bolt c, substantially as described.

In testimony whereof I affix my signature in presence of two witnesses.

GARLAND B. ST. JOHN.

Witnesses:
 JOHN C. SHARP,
 N. D. STRONG.